(12) United States Patent
Creech, Sr. et al.

(10) Patent No.: US 6,561,135 B1
(45) Date of Patent: May 13, 2003

(54) AQUARIUM PUMP BACKUP SYSTEM

(76) Inventors: Edmond A. Creech, Sr., 16311 Alderman Turner Rd., Wimauma, FL (US) 33598; Nancy L. Creech, 16311 Alderman Turner Rd., Wimauma, FL (US) 33598

( * ) Notice: Subject to any disclaimer, the term of this patent is extended or adjusted under 35 U.S.C. 154(b) by 0 days.

(21) Appl. No.: 09/510,549

(22) Filed: Feb. 22, 2000

(51) Int. Cl.[7] .............................................. A01K 61/00
(52) U.S. Cl. .................... 119/245; 210/169; 119/259; 119/264
(58) Field of Search ................................ 119/245, 259, 119/261, 263, 264; 210/169

(56) References Cited

U.S. PATENT DOCUMENTS

| 4,129,095 A | * | 12/1978 | Roberts et al. ............. 119/201 |
| 4,534,914 A | | 8/1985 | Takahashi et al. |
| 4,773,008 A | | 9/1988 | Schroeder et al. |
| 4,776,127 A | | 10/1988 | Jackson |
| 5,066,394 A | * | 11/1991 | Harrison ..................... 210/169 |
| 5,121,708 A | | 6/1992 | Nuttle |
| 5,433,843 A | * | 7/1995 | Calabrese .................. 210/138 |
| 5,480,590 A | | 1/1996 | Neshat et al. |
| 5,938,981 A | * | 8/1999 | Burgess ..................... 261/34.1 |
| 5,988,601 A | * | 11/1999 | Burgess ..................... 261/34.1 |
| 6,164,932 A | | 12/2000 | Tominaga et al. |
| 6,432,312 B1 | * | 8/2002 | Fuss ............................ 210/668 |

* cited by examiner

*Primary Examiner*—Yvonne Abbott
(74) *Attorney, Agent, or Firm*—David W. Pettis, Jr., PA

(57) ABSTRACT

The aquarium backup system operates upon failure of the pump that provides aeration and/or water circulation to aquariums. The backup system includes a sensor for determining when the flow of water to the aquarium is interrupted due to a power outage or pump failure. The sensor then closes a switch in electrical circuit between a backup battery and a backup pump, which re-establishes the aeration and/or water circulation to the aquarium.

5 Claims, 2 Drawing Sheets

AQUARIUM PUMP BACKUP SYSTEM

BACKGROUND OF THE INVENTION

1. Field of the Invention

The present invention relates to aquariums, and other bodies of water containing aquatic life. More particularly, the invention relates to a backup system for providing oxygen and when possible maintaining the necessary bacteria within the aquariums and bodies of water to sustain the aquatic life while the primary system is down.

2. Description of the Prior Art

Commercial fisheries and hobbyist's aquariums must be closely monitored to maintain the proper oxygen and bacterial content within the water containing the aquatic life to maintain a healthy environment. Water within the confines of tanks and still bodies of water become stagnant, and it is well-known to pump air into the water through aerators to add oxygen to the water, as shown in U.S. Pat. No. 4,776,127 issued to Calvin Jackson and U.S. Pat. No. 4,034,030 issued to Jep T. Bracy. Specific designs for aerators have been previously disclosed by U.S. Pat. No. 5,480,590, which was issued to Neshat et al, and U.S. Pat. No. 5,938,981 issued to Harry L. Burgess.

The patent to Tominaga et al., U.S. Pat. No. 6,164,932, discloses a pump that may be used alternatively to move air or water.

There are also a number of complex monitoring systems that have been devised for controlling the environment within aquariums, particularly those disclosed in a patent issued to Schroeder et al., U.S. Pat. No. 4,773,008.

Notwithstanding the existence of such prior art aerators and pumps, it remains clear that there is in need for a simple backup system to maintain aeration and water circulation when the primary aerators and pumps fail due to pump failure or power outage.

SUMMARY OF THE INVENTION

The present invention provides a backup system to protect against pump and power failure of the primary systems that provide the necessary oxygen to aquariums to ensure survival of the aquatic animal life. These existing systems comprise a first pump having a fluid inlet and a fluid outlet, and the first pump being connected to a power source for the operation thereof. The fluid inlet is connected in fluid flow relationship to a first fluid source. The first end of a first pipe is connected to the outlet of the pump and the second end of the pipe is in fluid flow relationship with the aquarium. The fluid flow created by the pump conducts fluid from the first fluid source, through the inlet of the pump, out the outlet of the pump and through the first pipe to the aquarium.

The aquarium backup apparatus is an improvement to the existing systems. The backup apparatus comprises a second pump that has an inlet and an outlet, the inlet being connected to a second fluid source and the outlet being connected in fluid flow relationship to the aquarium. A backup power source is connected by an electrical circuit to the second pump. A switch is connected to the electrical circuit, which is switchable between an off position, in which power is prevented from flowing, and an on position in which power is permitted to flow in the circuit thereby operating the pump. A sensor is inserted within the first pipe to detect fluid flow within the first pipe. The sensor permits the switch to remain in the off position as long as the sensor detects fluid flow in the first pipe. When the sensor determines that fluid flow has ceased in the first pipe, the sensor engages the switch moving the switch to the on position. The sensor maintains the switch in the on position until the sensor determines that fluid flow has returned to the first pipe.

The invention accordingly comprises an article of manufacturer possessing the features, properties, and the relation to elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings. The reference characters of the parts of a second preferred embodiment that are similar to be parts of the first preferred embodiment are increased by increments of 100.

DESCRIPTION OF THE PREFERRED EMBODIMENTS

Figure 3:
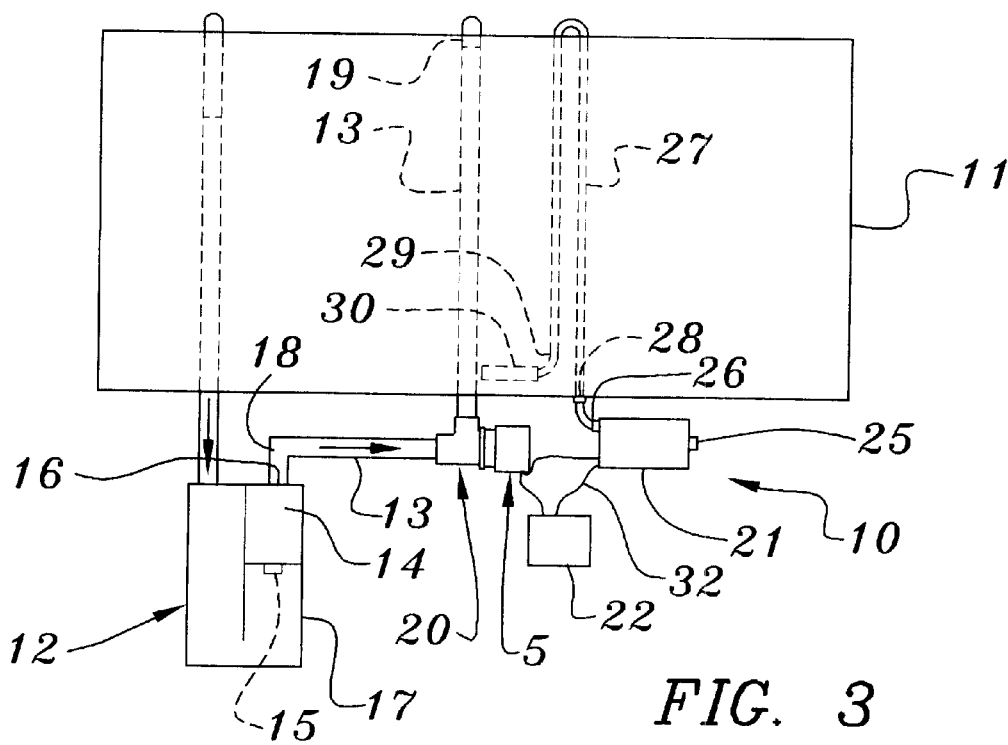
FIG. 3 is a front elevational view of a first embodiment of the invention illustrating its connection to an aquarium.

A preferred embodiment for the aquarium backup apparatus of this invention is illustrated in the schematic drawing FIG. 3, in which the backup apparatus is generally indicated as 10. The aquarium backup apparatus is shown connected to a standard aquarium filtration and aeration system shown generally as 12.

A standard aquarium filtration and aeration system 12 comprises a first pump, shown as 14. The first pump 14 is connected to a power source (not shown). The first pump 14 has a fluid outlet 16 and a fluid inlet 15, the fluid inlet 15 being connected in fluid flow relationship to a first fluid source, the aquarium 11. In a preferred embodiment, as illustrated in FIG. 3, the first pump 14 may be incorporated within a well known canister aquarium filter 17, which filters and circulates the aquarium water prior to returning the water to the aquarium 11. In other preferred embodiments the filter 17 may be separate from the pump 14. The standard filtration and aeration system 12 further comprises a first pipe 13, that has a first end 18 that is connected to the outlet 16 of the first pump 14 and a second end 19 that is in fluid flow relationship to the aquarium 24. Thus, a fluid flow is created by the pump to conduct fluid from the first fluid source, aquarium 11, through the canister aquarium filter 17, through the inlet 15 of the pump 14, out the outlet 16 of the pump 14 and through the first pipe 13 to the aquarium 11. There are many other types of standard aquarium aeration and filtration systems to which the following improvement may be connected.

As seen in FIG. 3, a preferred embodiment of the aquarium backup apparatus 10, which comprises an improvement to the standard aquarium filtration and aeration system 12, comprises a sensor 20, a second pump 21, a backup power source, conveniently a backup battery 22, and a switch 5.

The second pump 21 has an inlet 25 and an outlet 26, the inlet being connected in fluid flow relationship to a second fluid source, conveniently the ambient air, and the outlet 26 of said second pump 21 being connected in fluid flow relationship to the aquarium 11. The second pump 21, in this preferred embodiment, comprises an air pump. An air hose 27, having a first end 28 connected to the outlet 26 of the second pump 21, has a second end 29 that is attached to an aerator 30, conveniently an air stone, that is placed within the fluid in the aquarium 11 to provide an oxygen source.

The second pump 21 is operated by the backup battery 22. As the second pump 21 is only to operate when the first pump 14 fails, usually due to a power outage or pump failure, a switch 5 must be inserted within the circuit 32 between the backup battery 22 and the second pump 21. The switch 5 must be operatively signaled by a sensor 20 when the backup system is needed.

Figure 1:
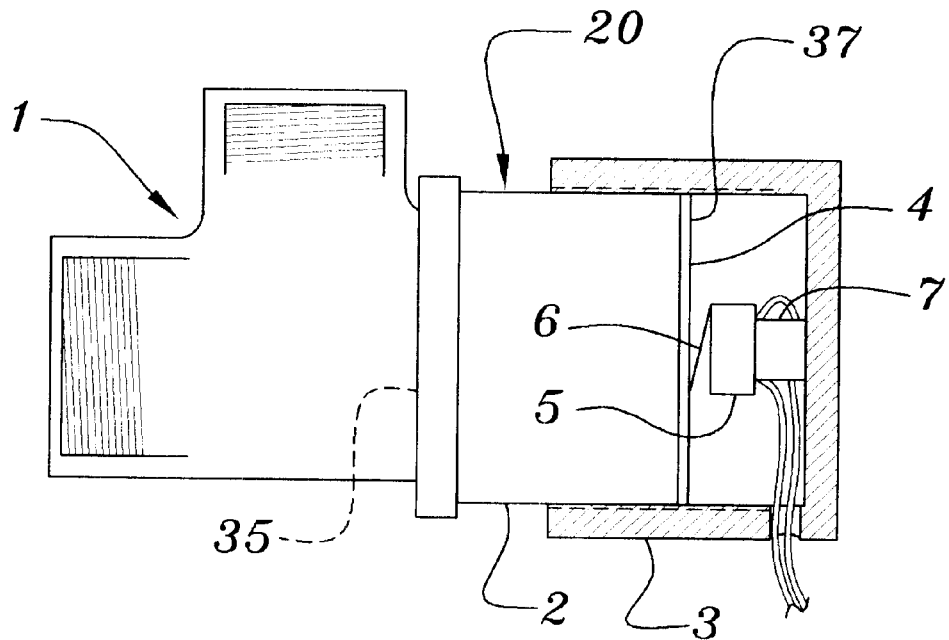
FIG 1. is a detailed cross-sectional front elevational view of the sensor and switch of the invention.
Figure 2:
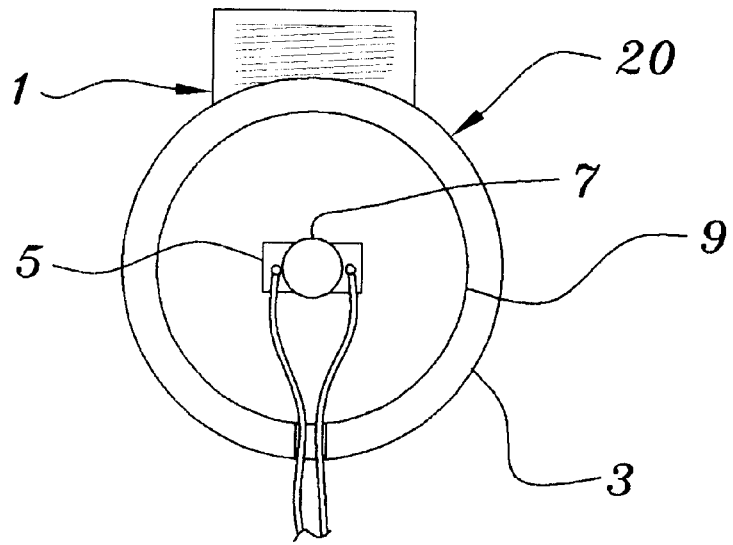
FIG. 2 is a right side elevational view of the sensor and switch of FIG. 1.

As seen in FIG. 1 and FIG. 2, the sensor 20 is inserted into the first pipe 13 by attachment of two openings of a PVC Tee fitting 1 to the pipe 13 leaving the third opening for attachment of a second pipe 2. The second pipe 2 has a first end 35 that is attached to the third opening of the PVC Tee fitting 1. The second end 37 of the second pipe 2 has a rubber diaphragm 4 sealingly mounted thereon. A PVC end cap 3 is mounted over the second end 37 of the second pipe 2 to which has been mounted a 3 amp microswitch, for example, Model No. D2F-L-D, manufactured by Omron Corporation of Schaumburg, Ill. The switch 5 may be mounted on a base 7, constructed from acrylic or other suitable material, that is attached to the PVC end cap 3 for purposes of spacing the switch in relationship to the rubber diaphragm 4. The switch lever 6 of the switch 5 is movable between an off position (in which the power is prevented from flowing in the circuit to the pump) and an on position (in which the power is permitted to flow in the circuit. In the on position, as seen in FIG. 1, the lever extends outwardly at an angle to the body of the switch 5. In the off position the lever is moved toward the body of the switch 5. When fluid flows through the pipe 13 it also the flows through the Tee fitting 1 and the pressure caused by the fluid in the pipe 13 causes the diaphragm 4 to expand pressing against the lever 6 and moving it to the off position. Therefore as long as fluid flows within pipe 13 the second pump 21 is not operated as it is not required. When flow stops within the pipe 13, the diaphragm contracts and the switch lever 6 moves to the on position permitting electricity to flow through the circuit from the backup battery 22 to the second pump 21 providing air through the air hose 27 and thus through the air stone 30. In this preferred embodiment, the sensor comprises a pressure sensor.

Figure 4:
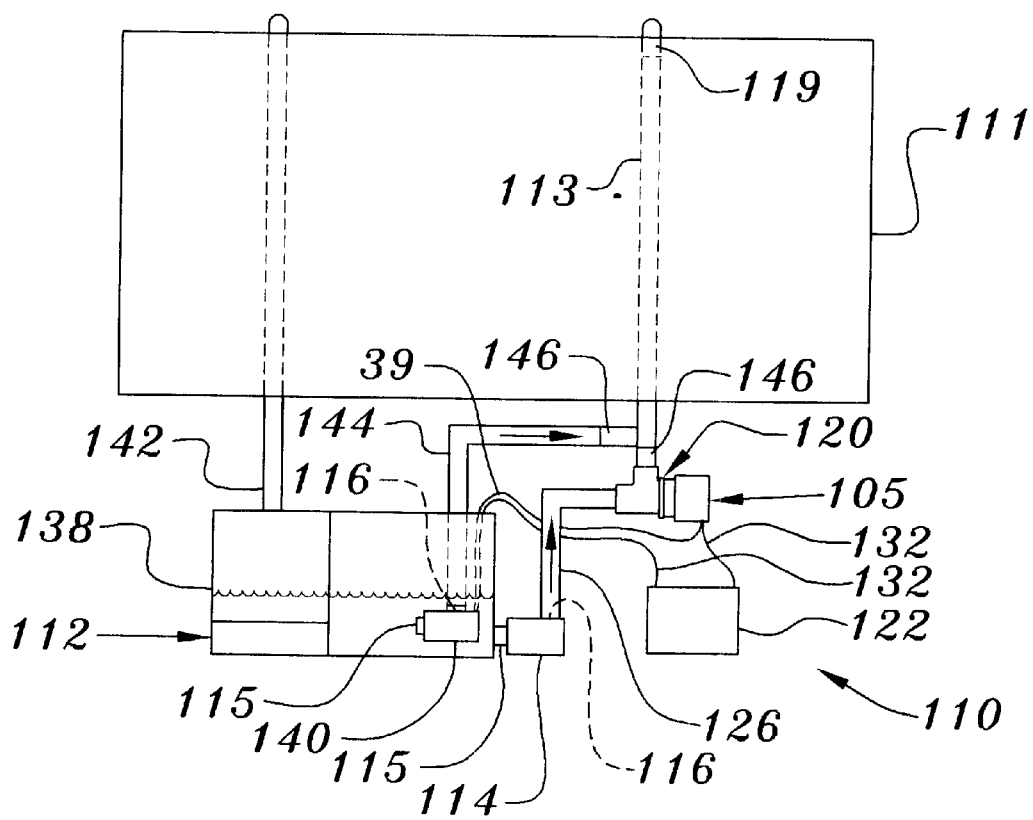
FIG. 4 is a front elevational view of a second embodiment of the invention illustrating its connection to an aquarium.

The aquarium filtration and aeration system 112, in a second preferred embodiment, as shown in FIG. 4, comprises a first pump, shown as 114. The first pump 114 is connected to a power source (not shown). The first pump 114 has a fluid outlet 116 and a fluid inlet 115, the fluid inlet 115 is connected in fluid flow relationship to a first fluid source, the aquarium 111. As illustrated in FIG. 4, the first pump 114 is connected to a well known wet-dry filter 138 as the source of oxygen to be added to the fluid received from the aquarium 111 through a drain pipe 142. The standard filtration and aeration system 112 further comprises a first pipe 113, that has a first end 118 that is connected to the outlet 116 of the first pump 114 and a second end 119 that is in fluid flow relationship with the aquarium 111. Thus, a fluid flow is created by the pump to conduct fluid from the first fluid source, aquarium 111, through the drain pipe 142, through the wet-dry filter 138, through the inlet 115 of the pump 114, out the outlet 116 of the pump 114 and through the first pipe 113 to the aquarium 111. The fluid in this embodiment comprises primarily water.

The improvement 110 in the preferred embodiment illustrated in FIG. 4, comprises a water pump 140 that is similar to a pump used to pump water from the bilges of boats. The pump 140 is a submersible pump and is immersed directly into the wet-dry filter 138 where the inlet 115 is in fluid flow communication with the aquarium 111 through the drain pipe 142 which siphons the water from the aquarium 111 into the wet-dry filter 138. The outlet 116 of the first pump 140 is in fluid flow communication with the aquarium 111 through a third pipe 144 which connects with the first pipe 113. To prevent the interchange of fluid between the standard and backup systems, a check valve 146 is installed in the third pipe 144 and in the first pipe 113 upstream of the connection of the third pipe 144 to the first pipe 113.

The sensor and switch disclosed in FIGS. 1 and 2 will have the same structure and will operate in the same manner as in the first preferred embodiment disclosed earlier. When the fluid flow through first pipe 113 ceases due to power failure or pump failure the switch will activate the second pump 140 which will pump the aerated fluid back into the aquarium 111.

While the foregoing describes a particularly preferred embodiment of the present invention, it is to be understood that numerous variations and modifications of the structure will occur to those skilled in the art. Accordingly, the foregoing description is to be considered illustrative only of the principles of this invention and is not to be considered limitative thereof, the scope of the invention being determined solely by the claims appended hereto.

What is claimed is:

1. An aquarium backup apparatus to be used in conjunction with an aquarium having a first pump attached thereto, the first pump being connected to a power source for the operation thereof, the first pump having a fluid inlet and a fluid outlet, the fluid inlet being connected to a first fluid source and a first pipe having a first end attached to the outlet of the pump, and a second end that is in fluid flow relation to the aquarium, such that a fluid flow is created by the pump to conduct fluid from the first fluid source through the inlet of the pump, out the outlet of the pump and through the first pipe to the aquarium, wherein the improvement comprises:

a second pump having an inlet and an outlet, said inlet being connected to a second fluid source and said outlet being connected in fluid flow relation to said aquarium;

a backup power source connected by an electrical circuit to said second pump;

a switch connected to said electrical circuit being switchable between an off position, in which power is prevented from flowing, and an on position in which power is permitted to flow in said circuit thereby operating said pump; and a sensor inserted within said first pipe to detect fluid flow in said first pipe and said sensor being connected to said switch, maintaining said switch in said off position when said sensor detects fluid flow in said first pipe and moving said switch to said on position and maintaining said switch in said on position when said sensor determines that there is no fluid flow in said first pipe.

2. An aquarium backup apparatus as in claim 1, wherein said sensor comprises a pressure sensor.

3. An aquarium backup apparatus as in claim 1, wherein said sensor comprises a second pipe having a first end and a second end, said first end being connected in fluid flow relationship to said first pipe, and said second end having a diaphragm sealingly attached thereto, such that when said fluid flow passes through said first pipe said diaphragm expands away from said fluid flow and said diaphragm engages said switch keeping said switch in said off position and when there is no fluid flow passing through said first pipe said diaphragm contracts and said switch moves to said on position.

4. An aquarium backup apparatus as in claim 1, wherein said second fluid source comprises an air source and said second pump comprises an air pump, a hose having a first end and a second end, said first end being connected to said outlet of said air pump, an aerator being attached to said second end of said hose and said aerator placed within said fluid in said aquarium, so that said air pump receives air through said inlet and pumps air out said aerator.

5. An aquarium backup apparatus as in claim 1, wherein the first fluid source and said second fluid source comprises water from said aquarium, said second pump comprises a water pump that receives water from said aquarium through said inlet of said second pump and pumps said water out said outlet and back to said aquarium.

* * * * *